(12) United States Patent
Kasztelan et al.

(10) Patent No.: US 6,207,870 B1
(45) Date of Patent: *Mar. 27, 2001

(54) CATALYST BASED ON A NOBLE GROUP VIII METAL CONTAINING SILICON AND POSSIBLY BORON, AND ITS USE IN HYDROTREATING HYDROCARBON-CONTAINING FEEDS

(75) Inventors: Slavik Kasztelan, Rueli-Malmaison; Samuel Mignard, Chatou; Virginie Harle, Lamorlaye; Nathalie Marchal-George, Saint Genis Laval, all of (FR)

(73) Assignee: Institut Francais du Petrole, Rueil-Malmaison (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/305,480

(22) Filed: May 6, 1999

(30) Foreign Application Priority Data

May 7, 1998 (FR) .......................................... 98 05

(51) Int. Cl.⁷ .............................. C10G 45/52; C07C 5/10
(52) U.S. Cl. ...................... 585/269; 585/266; 585/273; 208/144
(58) Field of Search .................................... 585/266, 269, 585/273; 208/144

(56) References Cited

U.S. PATENT DOCUMENTS

| 3,711,566 | * | 1/1973 | Estes et al. ............................ 585/258 |
| 3,755,148 | * | 8/1973 | Mickelson ............................. 208/143 |
| 4,080,284 | | 3/1978 | Mitchell ................................ 208/111 |
| 4,120,821 | | 10/1978 | Iizuka et al. .......................... 252/432 |
| 5,171,910 | * | 12/1992 | Horvath et al. ....................... 585/266 |
| 5,259,948 | * | 11/1993 | Lambert et al. ...................... 208/111 |
| 5,516,740 | | 5/1996 | Cody et al. ........................... 502/204 |
| 5,763,721 | | 6/1998 | Wu et al. .............................. 585/489 |

FOREIGN PATENT DOCUMENTS

| 0 653 242 | 5/1995 | (EP) . |
| 2 564 006 | 11/1985 | (FR) . |
| 2 758 278 | 7/1998 | (FR) . |
| 2 063 700 | 6/1981 | (GB) . |

OTHER PUBLICATIONS

Abstract of JP 04 074535 A (1992) Derwent Publication, AN 92–129098.

English Translation of claims of Laid–Open Patent Publication JP 4–74535.

* cited by examiner

*Primary Examiner*—Walter D. Griffin
(74) *Attorney, Agent, or Firm*—Millen White Zelano & Branigan

(57) ABSTRACT

The invention provides a catalyst including a support, at least one noble metal from group VIII of the periodic table, silicon as a dopant, optionally boron, optionally at least one group VIB element, optionally phosphorous and optionally at least one halogen. The invention also provides a particular preparation of the catalyst. The invention also concerns the use of this catalyst in the hydrotreatment of hydrocarbon-containing feeds, more particularly its use for hydrogenating aromatic compounds in a gas oil cut.

20 Claims, No Drawings

CATALYST BASED ON A NOBLE GROUP VIII METAL CONTAINING SILICON AND POSSIBLY BORON, AND ITS USE IN HYDROTREATING HYDROCARBON-CONTAINING FEEDS

FIELD OF THE INVENTION

The present invention relates to a catalyst for hydrotreating hydrocarbon containing feeds including at least one noble metal from group VIII and silicon as a doping element.

BACKGROUND OF THE INVENTION

Petroleum cuts, and in particular bases for fuels, gasolines, kerosines and gas oils, contain aromatic compounds the concentration of which has to be further and further reduced under new or future legislation limiting the amount of aromatic compounds in the above fuels.

Current processes for hydrogenating aromatic compounds in solvents or aromatic petroleum cuts such as kerosines or gas oils use noble metal type catalysts, for example platinum, deposited on an alumina support with a high specific surface area. However, such metals are highly sensitive to poisoning by sulphur-containing and nitrogen-containing compounds present in the feeds and thus such feeds have to be desulphurised and denitrogenated to a very great extent before treating them using a catalyst based on a noble metal.

It is thus important to produce aromatic compound hydrogenation catalysts in solvents or in aromatic petroleum cuts such as kerosines and gas oils which are highly active in the presence of sulphur and/or nitrogen and/or oxygen so as to reduce the severity of prior hydrotreatment and to achieve even higher degrees of hydrogenation.

Catalysts based on platinum and palladium have been described for the properties for hydrogenating aromatic compounds. In the case of using an alumina type support (United States patent U.S. Pat. No. 3,943,053), it is reported that it is necessary to precisely control the metal contents, as well as the preparation conditions. The use of supports based on silica-alumina has also been reported. Examples are U.S. Pat. No. 4,960,505, U.S. Pat. No. 5,308,814 and U.S. Pat. No. 5,151,172. Those catalysts are based on a highly specific zeolite and have the disadvantage of requiring selective deposition of noble metals onto the zeolite.

SUMMARY OF THE INVENTION

The present invention relates to a catalyst including at least one noble metal from group VIII (group 8, 9 and 10 in the new notation for the periodic table: Handbook of Chemistry and Physics, 76th edition, 1995, inside front cover), i.e., at least one metal selected from ruthenium, rhodium, palladium, osmium, iridium and platinum, associated with a porous matrix. The catalyst is characterized in that it includes silicon as a doping element. The catalyst also optionally includes boron, optionally phosphorous, optionally at least one group VIB element (group 6) and optionally at least one group VIIA element (group 17, the halogens).

The present invention also relates to processes for preparing the catalyst, and to its use in petroleum cut refining processes.

More particularly, the catalyst of the present invention can be used for hydrogenating aromatic compounds or for dearomatisation of aromatic compounds, or to reduce aromatic compounds in petroleum cuts containing, in particular, aromatic compounds and small quantities of sulphur and/or nitrogen and/or oxygen.

The invention thus relates to a catalyst with a strong hydrogenating phase and moderate acidity. The catalyst comprises at least one group VIII noble metal such as ruthenium, rhodium, palladium, osmium, iridium or platinum. The catalyst also comprises at least one support selected from the group formed by amorphous or low crystallinity supports. The catalyst is characterized in that it also comprises silicon as a doping element. The catalyst can also optionally contain boron, optionally phosphorous, optionally at least one group VIB element, preferably selected from molybdenum and tungsten, and optionally at least one group VIIA element, preferably two group VIIA elements, preferably chlorine and fluorine.

Said catalyst has, for example, an activity for hydrogenation of aromatic hydrocarbons in the presence of sulphur and/or nitrogen and/or oxygen which is higher than known prior art catalytic formulations. Without wishing to be bound to a particular theory, it appears that the improved properties of the catalysts of the present invention are due to reinforcing the acidity of the catalyst by the presence of silicon introduced into the matrix as a dopant. This increased acidity induces a better resistance of the active phase of the catalyst to poisoning by the sulphur and/or nitrogen and/or oxygen and thus improves the hydrogenating properties of the catalyst.

The catalyst of the present invention generally comprises at least one metal selected from the following groups and with the following contents, in weight % with respect to the total catalyst weight:

0.01% to 5%, preferably 0.01% to 2%, of at least one group VIII noble metal, preferably platinum, ruthenium or palladium;

0.1% to 97%, preferably 1% to 95%, of at least one support selected from the group formed by amorphous matrices and low crystallinity matrices, said catalyst being characterized in that it also comprises:

0.1% to 40%, preferably 0.1% to 30%, more preferably 0.1% to 20%, of silicon, (the % being expressed as % of oxides), and optionally:

0 to 20%, preferably 0.1% to 20%, of boron (the % being expressed as % of oxides);

0 to 20%, preferably 0.1% to 15%, more preferably 0.1% to 10%, of phosphorous (the % being expressed as % of oxides);

0 to 20%, preferably 0.1% to 15%, more preferably 0.1% to 10%, of at least one group VIIA element, preferably chlorine and fluorine;

0 to 3 %, preferably 0.1% to 3%, of at least one element selected from group VIB, preferably molybdenum or tungsten (the % being expressed as % of oxides).

The noble group VIII metals and the optional group VIB metals in the catalyst of the present invention can be completely or partially present in the form of the metal and/or oxide and/or sulphide.

The catalysts of the invention can be prepared using any suitable method. Preferably, the silicon and optional boron are introduced into the catalyst already comprising the support and the noble group VIII metal or metals. Preferably, a catalyst is impregnated with a solution, for example an aqueous solution, of silicon and optionally by a solution, for example an aqueous solution, of boron (in any order) or it is impregnated with a common solution, for example an aqueous solution, of boron and silicon when the catalyst contain silicon and boron.

More particularly, the process for preparing the catalyst of the present invention comprises the following steps:

a) weighing a solid hereinafter termed the precursor, comprising at least the following compounds: a porous amorphous and/or low crystallinity matrix, at least one noble group VIII element, optionally at least one group VIIA element, optionally phosphorous, optionally boron, and optionally at least one group VIB metal, the whole preferably being formed;

b) impregnating the solid precursor defined in step a) with at least one solution containing silicon;

c) leaving the moist solid in a moist atmosphere at a temperature in the range 10° C. to 180° C.

d) drying the moist solid obtained in step c) at a temperature in the range 60° C. to 150° C.;

e) calcining the solid obtained from step d) at a temperature in the range 150° C. to 800° C.

The precursor defined in step a) above can be prepared using any conventional methods known to the skilled person.

The silicon, optional boron, optional phosphorous, and optional element selected from group VIIA, the halogens, preferably chlorine and fluorine, can be introduced into the catalyst at various stages of the preparation and in a variety of manners.

The matrix is preferably impregnated using the "dry" impregnation method which is well known to the skilled person. Impregnation can be carried out in a single step using a solution containing all of the constituent elements of the final catalyst.

The phosphorous, boron, silicon, and elements selected from the halogens (group VIIA) can be introduced into the calcined precursor by one or more impregnation operations using an excess of solution.

Thus, for example, in the preferred case where the precursor is a platinum-palladium type supported on alumina, it is possible to impregnate this precursor with a Rhodorsil E1P silicone emulsion from Rhone Poulenc, drying at 80° C., then calcining at 350° C., for example, for 4 hours in dry air in a traversed bed, then impregnating with an ammonium fluoride solution, then drying at 80° C., then calcining, for example and preferably in dry air in a traversed bed, for example at 500° C. for 4 hours.

Other impregnation sequences can be implemented to obtain the catalyst of the present invention.

Thus in the case where the catalyst contains boron and silicon, it is possible to impregnate first with a solution containing silicon, to dry, to calcine and to impregnate with a solution containing boron, to dry and to carry out a final calcining. It is also possible to impregnate first with a solution containing boron, to dry, to calcine and to impregnate with the solution containing silicon, to dry and to carry out a final calcining. Preferably, it is possible to prepare a solution of at least one boron salt such as ammonium biborate in an alkaline medium and in the presence of hydrogen peroxide and to introduce into the solution a silicone type silicon compound and to carry out dry impregnation, in which the pore volume of the precursor is filled with the solution.

It is also possible first to impregnate the precursor with a solution containing phosphorous, to dry, to calcine then to impregnate the solid obtained with a solution containing boron, to dry and to calcine, and finally to impregnate the solid obtained with the solution containing silicon, to dry and to calcine.

Impregnation of the group VIB element can be facilitated by adding phosphoric acid to ammonium heptamolybdate solutions, which enables phosphorous to be introduced as well, so as to promote the catalytic activity. Other phosphorous compounds can be used, as is well known to the skilled person.

When the elements are introduced in a plurality of steps for impregnating the corresponding precursor salts, an intermediate drying and/or calcining step is generally carried out on the catalyst at a temperature in the range 60° C. to 350° C.

The catalyst of the present invention comprises a noble group VIII element such as ruthenium, rhodium, palladium, osmium. iridium or platinum, in particular platinum, ruthenium or palladium. Advantageously, the following combinations of metals are used: platinum-palladium, platinum-rhodium, platinum-ruthenium, palladium-rhodium, palladium-rutheniuim, rhodium-ruthenium; preferred combinations are platinum-palladium and palladium-ruthenium. It is also possible to use combinations of three metals, for example platinum-palladium-rhodium or platinum-palladium-ruthenium.

The sources of the noble group VIII metals which can be used are well known to the skilled person. Examples are halides, for example chlorides, nitrates, acids such as chloroplatinic acid, and oxychlorides such as ammoniacal ruthenium oxychloride.

A variety of silicon sources can be used. Examples are ethyl orthosilicate $Si(OEt)_4$, silanes, polysilanes, siloxanes, polysiloxanes, and halogenated silicates such as ammonium fluorosilicate $(NH_4)_2SiF_6$ or sodium fluorosilicate $Na_2SiF_6$. Silicomolybdic acid and its salts, and silicotungstic acid and its salts can also advantageously be used. Silicon can be added, for example, by impregnating ethyl silicate in solution in a water/alcohol mixture. Silicon can also be added, for example, by impregnation using a polyalkylsiloxane type silicon compound suspended in water.

The boron source can be boric acid, preferably orthoboric acid $H_3BO_3$, ammonium biborate or pentaborate, boron oxide, or boric esters. Boron can, for example, be introduced in the form of a solution of boric acid in a water/alcohol mixture or in a water/ethanolamine mixture.

The preferred phosphorous source is orthophosphoric acid $H_3PO_4$, but its salts and esters such as ammonium phosphates are also suitable. Phosphorous can, for example, be introduced in the form of a mixture of phosphoric acid and a basic organic nitrogen-containing compound, such as ammonia, primary and secondary amines, cyclic amines, pyridine group compounds, quinolines, and pyrrole group compounds.

Sources of group VIIA elements which can be used are well known to the skilled person. As an example, fluoride anions can be introduced in the form of hydrofluoric acid or its salts. These salts are formed with alkali metals, ammonium or an organic compound. In the latter case, the salt is advantageously formed in the reaction mixture by reacting the organic compound with hydrofluoric acid. It is also possible to use hydrolysable compounds which can liberate fluoride anions in water, such as ammonium fluorosilicate $(NH_4)_2SiF_6$, sodium fluorosilicate $Na_2SiF_6$ or silicon tetrafluoride SiF4. Fluorine can be introduced, for example, by impregnation using an aqueous hydrofluoride solution or ammonium fluoride or ammonium bifluoride.

Sources of group VIB elements which can be used are well known to the skilled person. Examples of molybdenum and tungsten sources are oxides and hydroxides, molybdic acids and tungstic acids and their salts, in particular ammonium salts such as ammonium molybdate, ammonium heptamolybdate, ammonium tungstate, phosphomolybdic acid, phosphotungstic acid and their salts. Preferably, oxides and ammonium salts are used, such as ammonium molybdate, ammonium heptamolybdate and ammonium tungstate.

The catalyst of the present invention thus also comprises at least one porous mineral matrix which is normally amorphous or of low crystallinity. This matrix is normally selected from the group formed by alumina, silica and silica-alumina. Aluminates can also be selected. Preferably, matrices containing alumina are used, in any of the forms known to the skilled person, for example gamma alumina.

Mixtures of alumina and silica, and mixtures of alumina and silica alumina can advantageously be used.

The catalysts obtained in the present invention are formed into grains of different shapes and dimensions. They are generally used in the form of cylindrical or polylobed extrudates such as bilobes, trilobes, or polylobes with a straight or twisted shape, but they can also be produced and used in the form of compressed powder, tablets, rings, beads or wheels. The specific surface area of the catalysts is measured by nitrogen adsorption using the BET method (Brunauer, Emmett, Teller, J. Am. Chem. Soc., vol. 60, 309–316 (1938)) and is in the range 50 to 600 $m^2/g$, the pore volume measured using a mercury porisimeter is in the range 0.2 to 1.5 $cm^3/g$ and the pore size distribution may be unimodal, bimodal or polymodal.

The catalyst of the present invention can be reduced using any method known to the skilled person.

Because of the great sensitivity of noble metals to poisoning by sulphur, it may be appropriate to use a mild catalyst sulphurisation method. Any of the conventional methods which are known to the skilled person can be used. One of those methods consists of exposing the catalyst to a very light feed such as a white spirit to which a sulphur-containing compound such as dimethyldisulphide has been added. The catalyst is then sulphurised at a temperature in the range 100° C. to 800° C., preferably 150° C. to 6000° C.

More particularly, the catalyst of the present invention can be used for hydrogenation of aromatic compounds or for dearomatisation, or for reducing the aromatic compound content of petroleum cuts containing, in particular, aromatic compounds and small quantities of sulphur and/or nitrogen and/or oxygen.

The feeds used in the process are aromatic feeds generally containing less than 2000 ppm by weight of sulphur, less than 1000 ppm by weight of nitrogen, less than 1000 ppm by weight of oxygen, a portion of which can be present in the form of water. These feeds have generally already been hydrorefined to reduce the sulphur, nitrogen and oxygen contents. They may be gasolines, kerosines, gas oils from distilling a crude oil or feeds such as vacuum gas oils, or deasphalted or non deasphalted distillation residues, which may or may not have already been refined. The treated feeds are feeds with an initial distillation point of more than 80° C. and less than 580° C.

The hydrorefining conditions such as temperature, pressure, hydrogen recycle ratio, and hourly space velocity, can vary widely depending on the nature of the feed, the quality of the desired products and the facilities available to the refiner. The temperature is generally over 150° C. and usually in the range 200° C. to 320° C. The pressure is over 0.1 MPa and usually in the range 1.5 to 10 MPa. The hydrogen recycle ratio is a minimum of 10 and usually in the range 20 to 2000 normal litres of hydrogen per litre of feed. The hourly space velocity is generally in the range 0.1 to 40 volumes of feed per volume of catalyst per hour, preferably in the range 0.1 to 10. The results which are of interest to the refiner in this case are the aromatic compound hydrogenation activity.

The following examples illustrate the present invention without in any way limiting its scope.

EXAMPLE 1

Preparation of Supports Forming Part of the Composition of the Catalysts of the Invention a. SUPPORT S1

We produced large quantities of an alumina based support in order to be able to prepare the catalysts described below from the same formed support. To this end, we used a matrix composed of ultrafine tabular boehmite or alumina gel sold by Condéa Chemie GmbH under the trade name SB3. This gel was mixed with an aqueous solution containing 66% nitric acid (7% by weight of acid per gram of dry gel) then milled for 15 minutes. After milling, the paste obtained was passed through a die with cylindrical orifices with a diameter of 1.3 mm. The extrudates were then dried overnight at 120° C. and calcined at 550° C. for 2 hours in moist air containing 7.5% by volume of water. Support S1 was obtained in the form of cylindrical extrudates 1.2 mm in diameter, with a specific surface area of 243 $m^2/g$, a pore volume of 0.61 $cm^3/g$ and a unimodal pore distribution centred on 10 nm. Analysis of the matrix by X ray diffraction revealed that it was composed solely of low crystallinity cubic gamma alumina. This support was designated S1.

b. SUPPORT S2

We then produced large quantities of an alumina based support containing fluorine. To this end, we used the S1 alumina produced above and then firstly, we impregnated it with a hydrochloric acid solution so as to obtain a support containing about 1% by weight of chlorine. After drying overnight at 120° C., the extrudates were dried and calcined at 500° C. for two hours in dry air.

c. SUPPORT S3

This chlorinated alumina or support S2 was impregnated with an excess of hydrofluoric acid solution to obtain a fluorinated support containing 1.1% by weight of F. After impregnation, the extrudates were dried overnight at 120° C., then calcined at 550° C. for 2 hours in dry air. Support S3 was obtained; analysis showed it to contain 1.05% by weight of F and 0.70% by weight of Cl.

d. SUPPORT S4

We also produced large quantities of an alumina based support containing phosphorous and fluorine. To this end, we used alumina S1 and we dry impregnated it with a phosphoric acid solution to obtain a phosphorous-containing support S4 containing 8.5% by weight Of $P_2O_5$.

e. SUPPORT S5

After drying it overnight and calcining in dry air at 350° C. for 2 hours, we impregnated support S4 with an excess of a hydrochloric acid solution to obtain a support S5 containing about 1% by weight of chlorine. After drying overnight at 120° C., the extrudates were dried and calcined at 500° C. for two hours in dry air.

f. SUPPORT S6

This chlorinated and phosphorous-containing alumina S5 was impregnated with an excess of a hydrofluoric acid solution to deposit about 1% by weight of F. After impregnation, the extrudates were dried overnight at 120° C. then calcined at 550° C. for 2 hours in dry air. Support S6 was obtained; analysis showed it to contain 8.45% by weight of $P_2O_5$, 1.05% by weight of F and 0.61% by weight of Cl.

e. SUPPORT S7

We produced a support containing alumina and about 3.2% by weight of boron oxide $B_2O_3$. To this end, we used a matrix composed of ultrafine tabular boehmite or alumina gel sold by Condéa Chemie GmbH under the trade name SB3. This gel was mixed with an aqueous solution containing 66% nitric acid (7% by weight of acid per gram of dry gel) then milled for 15 minutes. Then an ammonium biborate solution was added and milling was continued for 5 minutes. After milling, the paste obtained was passed through a die with cylindrical orifices with a diameter of 1.3 mm. The extrudates were then dried overnight at 120° C. and calcined at 550° C. for 2 hours in moist air containing 7.5% by volume of water. Support S7 was obtained in the form of cylindrical extrudates 1.2 mm in diameter, with a specific surface area of 263 m²/g, a pore volume of 0.59 cm₃/g and a unimodal pore distribution centred on 9 nm. Analysis of the matrix by X ray diffraction revealed that it was composed solely of low crystallinity cubic gamma alumina.

h. SUPPORT S8

We also produced a support containing alumina and about 3.0% by weight of silica $SiO_2$. To this end, we used a matrix composed of ultrafine tabular boehmite or alumina gel sold by Condéa Chemie GmbH under the trade name SB3. This gel was mixed with an aqueous solution containing 66% nitric acid (7% by weight of acid per gram of dry gel) then milled for 15 minutes. Then a Rhodorsil EP1® silicone emulsion was added and milling was continued for 5 minutes. After milling, the paste obtained was passed through a die with cylindrical orifices with a diameter of 1.3 mm. The extrudates were then dried overnight at 120° C. and calcined at 550° C. for 2 hours in moist air containing 7.5% by volume of water. Support S8 was obtained in the form of cylindrical extrudates 1.2 mm in diameter, with a specific surface area of 290 m²/g, a pore volume of 0.52 cm3/g and a unimodal pore distribution centred on 7 nm. Analysis of the matrix by X ray diffraction revealed that it was composed solely of low crystallinity cubic gamma alumina.

EXAMPLE 2

Preparation of a Pt/alumina Catalyst

We impregnated the extruded support S1 of Example 1 with an excess of platinum bis-acetylacetonate $Pt(C_5H_9O_2)_2$ solution in toluene. After filtering, the extrudates were calcined at 500° C. for 2 hours in dry air. The final platinum content was 0.61% by weight. Catalyst A2 obtained, the characteristics of which are summarised in Table 1, was representative of industrial catalysts.

We also impregnated the extruded supports S7 and S8 of Example 1 with an excess of platinum bis-acetylacetonate $Pt(C_5H_9O_2)_2$ solution in toluene. After filtering, the extrudates were calcined at 500° C. for 2 hours in dry air. The intended platinum content was 0.60% by weight. The characteristics of catalysts A21 and A22 are summarised in Table 1.

EXAMPLE 3

Preparation of Pt/alumina+B and/or Si Catalysts

Three catalysts, A31, A32 and A33, were prepared by dry impregnating the Pt/alumina catalyst extrudates described in Example 2 (catalyst A2) with an aqueous solution containing either ammonium biborate (catalyst A31), or with a Rhodorsil EP1 silicone emulsion (catalyst A32) or with a mixture of those two compounds (catalyst A33). When using the ammonium biborate, dissolution was facilitated by adding a compound of 30% by volume hydrogen peroxide such that the $H_2O_2/B_2O_3$ ratio was 1.8. After maturing at room temperature in a water-saturated atmosphere, the impregnated extrudates were dried overnight at 120° C, then calcined at 500° C. for 1 hour in dry air. The characteristics of these three catalysts are summarised in Table 1.

TABLE 1

Pt catalysts containing B and/or Si

| Catalyst | A2 | A21 | A22 | A31 | A32 | A33 |
|---|---|---|---|---|---|---|
| Formula | Pt | PtB | PtSi | PtB | PtSi | PtSiB |
| Support | S1 | S7 | S8 | S1 | S1 | S1 |
| Precursor | S1 | S7 | S8 | A2 | A2 | A2 |
| Pt (wt %) | 0.61 | 0.59 | 0.60 | 0.59 | 0.60 | 0.58 |
| $B_2O_3$ (wt %) | 0 | 3.18 | 0 | 3.20 | 0 | 3.15 |
| $SiO_2$ (wt %) | 0 | 0 | 3.06 | 0 | 2.90 | 2.99 |

EXAMPLE 4

Preparation of Pt+Cl/alumina Catalyst Precursor

We dry impregnated the extruded support S1 of Example 1 with an aqueous hexachloroplatinic acid solution $H_2PtCl_6.nH_2O$ to which hydrochloric acid had been added to obtain a catalyst containing about 0.9% by weight of chlorine. After maturing at room temperature in a water-saturated atmosphere, the impregnated extrudates were dried overnight at 120° C. then calcined at 550° C. for 2 hours in dry air. Catalyst A4 was obtained, which was representative of industrial catalysts; its characteristics are summarised in Table 2.

In the same way, we then dry impregnated the extruded supports S7 and S8 of Example 1 with an aqueous hexachloroplatinic acid solution $H_2PtCl_6.nH_2O$ to which hydrochloric acid had been added to obtain a catalyst containing about 0.9% by weight of chlorine. After maturing at room temperature in a water-saturated atmosphere, the impregnated extrudates were dried overnight at 120° C. then calcined at 550° C. for 2 hours in dry air. Catalysts A41 and A42 were obtained; their characteristics are summarised in Table 2.

TABLE 2

PtCl catalysts containing B and/or Si

| Catalyst | A4 | A41 | A42 | A51 | A52 | A53 |
|---|---|---|---|---|---|---|
| Formula | PtCl | PtClB | PtClSi | PtClB | PtClSi | PtClBSi |
| Support | S1 | S7 | S8 | S1 | S1 | S1 |
| Precursor | S1 | S7 | S8 | A4 | A4 | A4 |
| Pt (wt %) | 0.60 | 0.58 | 0.57 | 0.58 | 0.56 | 0.58 |
| $B_2O_3$ (wt %) | 0 | 3.07 | 0 | 3.30 | 0 | 3.12 |
| $SiO_2$ (wt %) | 0 | 0 | 2.98 | 0 | 2.84 | 2.94 |
| Cl (wt %) | 0.96 | 1.04 | 1.09 | 0.98 | 0.95 | 0.93 |

EXAMPLE 5

Preparation of Pt+Cl/alumina+B and/or Si Catalysts

A catalyst A51 was prepared by dry impregnation of extrudates of catalyst A4 using a 30% hydrogen peroxide solution containing ammonium biborate such that the $H_2O/B_2O_3$ mole ratio was 1.8. After maturing at room temperature in a water-saturated atmosphere, the impregnated extrudates were dried overnight at 120° C. then calcined at 500° C. for 1 hour in dry air. The characteristics of this catalyst are summarised in Table 2.

Catalyst A52 was prepared by dry impregnation of extrudates of catalyst A4, PtCl/alumina, described above, with a Rhodorsil EP1 silicone emulsion. After maturing at room temperature in a water-saturated atmosphere, the impregnated extrudates were dried overnight at 120° C. then calcined at 500° C. for 2 hours in dry air. The characteristics of this catalyst are summarised in Table 2.

A catalyst A53 was prepared by dry impregnation of extrudates of the Pt+Cl/alumina catalyst described in Example 4 (catalyst A4) using an aqueous solution containing a mixture of ammonium biborate and Rhodorsil EP1 silicone emulsion (catalyst A53). Dissolution was facilitated by adding a volume of 30% hydrogen peroxide such that the $H_2O_2/B_2O_3$ mole ratio was 1.8. After maturing at room temperature in a water-saturated atmosphere, the impregnated extrudates were dried overnight at 120° C. then calcined at 500° C. for 1 hour in dry air. The characteristics of this catalyst are summarised in Table 2.

EXAMPLE 6

Preparation of Pt+Cl+F/alumina Precursor

We dry impregnated the extruded support S3 of Example 1 with an aqueous hexachloroplatinic acid solution $H_2PtCl_6.nH_2O$ to which hydrochloric acid had been added to obtain a catalyst containing about 0.9% by weight of chlorine. After maturing at room temperature in a water-saturated atmosphere, the impregnated extrudates were dried overnight at 120° C. then calcined at 550° C. for 2 hours in dry air. Catalyst A6 was obtained, which was representative of industrial catalysts; its characteristics are summarised in Table 3.

EXAMPLE 7

Preparation of Pt+Cl+F+B and/or Si/alumina Catalyst

A catalyst A71 was prepared by dry impregnation of extrudates of catalyst A6 using a 30% by volume hydrogen peroxide solution containing ammonium biborate such that the $H_2O_2/B_2O_3$ mole ratio was 1.8. After maturing at room temperature in a water-saturated atmosphere, the impregnated extrudates were dried overnight at 120° C., then calcined at 500° C. for 1 hour in dry air. The characteristics of this catalyst are summarised in Table 3.

Catalyst A72 was prepared by dry impregnation of extrudates of catalyst A6 with an aqueous solution of a Rhodorsil EP1 silicone emulsion. After maturing at room temperature in a water-saturated atmosphere, the impregnated extrudates were dried overnight at 120° C. then calcined at 500° C. for 2 hours in dry air. The characteristics of this catalyst are summarised in Table 3.

A catalyst A73 was prepared by dry impregnation of extrudates of the Pt+Cl+F/alumina catalyst described in Example 6 (catalyst A6) using an aqueous solution containing a mixture of ammonium biborate and Rhodorsil EP1 silicone emulsion (catalyst A73). Dissolution was facilitated by adding a volume of 30% by volume hydrogen peroxide such that the $H_2O_2/B_2O_3$ mole ratio was 1.8. After maturing at room temperature in a water-saturated atmosphere, the impregnated extrudates were dried overnight at 120° C. then calcined at 500° C. for 1 hour in dry air. The characteristics of this catalyst are summarised in Table 3.

TABLE 3

PtClF/alumina catalysts containing B and/or Si

| Catalyst Formula | A6 PtClF | A71 PtClFB | A72 PtClFSi | A73 PtClFSiB |
|---|---|---|---|---|
| Pt (wt %) | 0.57 | 0.57 | 0.56 | 0.55 |
| $B_2O_3$ (wt %) | 0 | 3.15 | 0 | 3.12 |
| $SiO_2$ (wt %) | 0 | 0 | 2.75 | 2.72 |
| F (wt %) | 1.05 | 1.05 | 0.95 | 0.93 |
| Cl (wt %) | 0.85 | 0.83 | 0.82 | 0.82 |

EXAMPLE 8

Preparation of Pt+Cl+F+P/alumina+B and/or Si Catalyst

Support S6 of Example 1 was impregnated with hexachloroplatinic acid $H_2PtCl_6.nH_2O$ to obtain an intermediate catalyst with reference A81 containing Pt, Cl, F and P. After drying at 120° C. for 12 hours and calcining at 550° C. for 2 hours, it was impregnated with ammonium biborate (catalyst A82), or with a Rhodorsil EP1 silicone emulsion (catalyst A83) or B and Si using a mixture of the above two compounds simultaneously (catalyst A84). The proportions of the various elements Pt, Cl, F, B or Si and the characteristics of these catalysts are summarised in Table 4.

TABLE 4

PtPFCl/alumina catalysts containing B and/or Si

| Catalyst Formula | A81 PtPClF | A82 PtPClFB | A83 PtPFClSi | A84 PtPFClSiB |
|---|---|---|---|---|
| Pt (wt %) | 0.59 | 0.55 | 0.56 | 0.56 |
| $P_2O_5$ (wt %) | 8.55 | 8.64 | 8.43 | 8.35 |
| $B_2O_3$ (wt %) | 0 | 3.12 | 0 | 3.21 |
| $SiO_2$ (wt %) | 0 | 0 | 2.95 | 7.79 |
| F (wt %) | 0.96 | 0.92 | 0.91 | 0.92 |
| Cl (wt %) | 0.89 | 0.89 | 0.86 | 0.84 |

EXAMPLE 9

Preparation of Catalysts Containing a Group VIB Element

Starting from catalyst A81 already containing Pt, F, Cl and P, about 2.7% by weight of $MoO_3$, 3.1% of $B_2O_3$ and 2.6% of $SiO_2$ were deposited by dry impregnation of a solution of an ammonium heptamolybdate, ammonium biborate and Rhodorsil E1P. to encourage dissolution, 30% by volume hydrogen peroxide solution was added to the Mo and B solution such that the quantity of $H_2O_2$ satisfied the molar formula $[H_2O_2]=0.5[MoO_3]+1.8[B_2O_3]$. After drying overnight at 120° C. and calcining at 500° C. for 1 hour in dry air, catalyst A11 was obtained; its content is shown in Table 5.

EXAMPLE 10

Preparation of Pt+Pd Catalysts

Support S3 of Example 1 was impregnated with hexachloroplatinic acid $H_2PtCl_6$ so as to obtain a catalyst containing 0.3% of Pt and about 0.9% by weight of chlorine. After drying and calcining, it was impregnated with palladium bis-acetylacetonate so as to obtain a quantity of palladium of 0.3% by weight. After drying at 120° C. for 12 hours and calcining at 550° C. for 2 hours, catalyst A12 was obtained. Catalyst A12 was then impregnated with B and Si simultaneously (catalyst A13). The proportions of the various elements Pt, Pd, Cl, F, B and Si and the characteristics of these catalysts are summarised in Table 5.

EXAMPLE 11

Preparation of Pt+Pd Catalysts Containing a Group VIB Element

Starting from catalyst A12 already containing Pt, Pd, F, Cl and P, about 2.7% by weight of $MoO_3$, 3.1% of $B_2O_3$ and 2.6% of $SiO_2$ were deposited by dry impregnation of a solution of ammonium heptamolybdate, ammonium biborate and Rhodorsil E1P. To encourage dissolution, 30% by volume hydrogen peroxide solution was added such that the quantity of $H_2O_2$ satisfied the molar formula $[H_2O_2]=0.5[MoO_3]+1.8[B_2O_3]$. After drying overnight at 120° C. and calcining at 500° C. for 1 hour in dry air, catalyst A14 was obtained.

In the same way, starting from catalyst A12 already containing Pt, Pd, F, Cl and P, about 2.7% by weight of $WO_3$, 3.1% of $B_2O_3$ and 2.6% of $SiO_2$ were deposited by dry impregnation of a solution of ammonium tungstate, ammonium biborate and Rhodorsil E1P. To encourage dissolution, 30% by volume hydrogen peroxide solution was added to the Mo and B solution such that the quantity of $H_2O_2$ satisfied the molar formula $[H_2O_2]=0.5[WO_3]+1.8[B_2O_3]$. After drying overnight at 120° C. and calcining at 500° C. for 1 hour in dry air, catalyst A15 was obtained.

TABLE 5

PtPFClSiB/alumina catalysts containing Pd, Mo or W

| Catalyst | A11 | A12 | A13 | A14 | A15 | A16 | A17 |
|---|---|---|---|---|---|---|---|
| Formula | PtPFCl SiBMo | PtPdPF Cl | PtPdPF ClSiB | PtPdPF ClSiB Mo | PtPdPF ClSiBW | PtPdF ClSi | PtPd F ClB |
| Pt (wt %) | 0.55 | 0.30 | 0.27 | 0.29 | 0.30 | 0.29 | 0.28 |
| Pd (wt %) | 0 | 0.29 | 0.27 | 0.27 | 0.30 | 0.29 | 0.29 |
| $P_2O_5$ (wt %) | 8.42 | 8.45 | 8.32 | 8.43 | 8.25 | 0 | 0 |
| $B_2O_3$ (wt %) | 3.10 | 0 | 3.05 | 3.15 | 3.08 | 0 | 3.08 |
| $SiO_2$ (wt %) | 2.65 | 0 | 2.55 | 2.70 | 2.75 | 2.75 | 0 |
| F (wt %) | 0.95 | 0.98 | 0.96 | 0.92 | 0.94 | 0.93 | 1.04 |
| Cl (wt %) | 0.83 | 0.88 | 0.86 | 0.90 | 0.86 | 0.89 | 0.89 |
| $MoO_3$ (wt %) | 2.80 | 0 | 0 | 2.72 | 0 | 0 | 0 |
| $WO_3$ (wt %) | 0 | 0 | 0 | 0 | 2.73 | 0 | 0 |

Support S3 of Example 1 was impregnated with hexachloroplatinic acid $H_2PtCl_6.nH_2O$ to which hydrochloric acid had been added so as to obtain a catalyst containing 0.3% of Pt and about 0.9% by weight of chlorine. After drying and calcining, it was impregnated with palladium bis-acetylacetonate so as to obtain a quantity of palladium of 0.3% by weight. After drying at 120° C. for 12 hours and calcining at 550° C. for 2 hours, catalyst A16 was obtained.

Support S3 of Example 1 was impregnated with hexachloroplatinic acid $H_2PtCl6.nH_2O$ to which hydrochloric acid had been added so as to obtain a catalyst containing 0.3% of Pt and about 0.9% by weight of chlorine. After drying and calcining, it was impregnated with palladium bis-acetylacetonate so as to obtain a quantity of palladium of 0.3% by weight. After drying at 120° C. for 12 hours and calcining at 550° C. for 2 hours, the catalyst was then impregnated with a 30% by volume hydrogen peroxide solution containing ammonium biborate such that the $H_2O_2/B_2O_3$ ratio was 1.8 in order to deposit B. After drying overnight at 120° C. and calcining at 500° C. for 1 hour, catalyst A17 was obtained.

EXAMPLE 12

Aromatic Compound Hydrogenation Test

The catalysts described above were compared in a test for hydrogenating a hydrotreated gas oil, the principal characteristics of which are given in the following table:

| Density at 15° C. | 0.901 |
|---|---|
| Sulphur | 26 ppm by weight |
| Total nitrogen | 7 ppm by weight |
| Aromatic compound content | 65% by weight |
| Simulated distillation | |

-continued

| Initial point | 145° C. |
|---|---|
| 10% point | 211° C. |
| 50% point | 278° C. |
| 90% point | 349° C. |
| End point | 408° C. |

The test was carried out in an isothermal pilot reactor with a fixed traversed bed. The fluids circulated from bottom to top. After drying at 280° C. in situ in the unit under the hydrogen pressure for at least two hours, the gas oil was injected. The operating conditions of the hydrogenation test were as follows:

| Total pressure | 6 MPa |
|---|---|
| Catalyst volume | 40 cm³ |
| Temperature | 280° C. |
| Hydrogen flow rate | 20 l/h |
| Feed flow rate | 40 cm³/h |

The catalytic performances of the tested catalysts are shown in Table 7 below. They are expressed as the relative activity, supposing that of catalyst A4 to be equal to 1. Aromatic hydrogenation is a first order reaction and as a result the activity was calculated using the formula:

$$A_{HYD}=Ln[100]/100-\%HDA$$

The hydrodesulphuration reaction was almost complete since the sulphur contents in the effluents were always less than 0.2 ppm by weight of sulphur.

TABLE 7

Activity of catalysts for gas oil hydrogenation

| Catalyst | Formula | $A_{HYD}$ relative to A4 |
|---|---|---|
| A2 | Pt/alumina | 0.1 |
| A21 | Pt/alumina-B | 0.09 |
| A22 | Pt/alumina-Si | 0.07 |
| A31 | PtB/alumina | 0.18 |
| A32 | PtSi/alumina | 0.27 |
| A33 | PtSiB/alumina | 0.35 |
| A4 | PtCl/alumina | 1 |
| A41 | PtCl/alumina-B | 0.9 |
| A42 | PtCl/alumina-Si | 1.15 |
| A51 | PtClB/alumina | 1.12 |
| A52 | PtClSi/alumina | 1.45 |
| A53 | PtClBSi/alumina | 1.55 |
| A6 | PtClF/alumina | 2.13 |
| A71 | PtClFB/alumina | 2.21 |
| A72 | PtClFSi/alumina | 2.41 |
| A73 | PtClFSiB/alumina | 2.78 |
| A81 | PtPClF/alumina | 1.99 |
| A82 | PtPClFB/alumina | 2.21 |
| A83 | PtPClFSi/alumina | 2.34 |
| A84 | PtPClFSiB/alumina | 2.85 |
| A11 | PtPClFSiBMo/alumina | 3.01 |
| A13 | PtPdPClFSiB/alumina | 4.06 |
| A14 | PtPdPClFSiBMo/alumina | 4.15 |
| A15 | PtPdPClFSiBW/alumina | 4.25 |
| A16 | PtPdClFSi/alumina | 4.06 |
| A17 | PtPdFClB/alumina | 3.06 |

It can be seen from Table 7 that the activity for hydrogenation of aromatic compounds in the presence of a small quantity of sulphur in the gas oil is better when silicon is added to the Pt/alumina catalyst (catalyst A32), or that it is better still when boron and silicon are added (catalyst A33). These positive effects on the activity for hydrogenation of aromatic compounds is seen in the catalyst series A81, A82, A83 and A84 where it can be seen that adding Si improves the activity of a catalyst containing Pt, P, Cl and F on alumina and the activity is improved still further when B and Si are added. Finally, it should be noted that catalysts containing chlorine and/or fluorine are better than those which do not contain it/them. The activity is generally better still when a composition with two group VIII metals, such as platinum and palladium, is used (catalysts A11, A13, A14, A15).

Comparing catalysts A32 and A22, it can be seen that it is beneficial to add boron or silicon to the catalyst containing at least one noble group VIII element supported on an oxide matrix, rather than introducing boron or silicon to the support before forming it.

What is claimed is:

1. In a catalytic process for hydrogenating an aromatic hydrocarbon-containing feed with hydrogen under hydrogenating conditions, the improvement comprising contacting the feed with a catalyst comprising platinum, said platinum being deposited on a support, said catalyst comprising silicon as a doping element wherein the catalyst is prepared by a process in which a catalytic mass or precursor based on a support comprising platinum is impregnated with at least one solution based on silicon resulting in a higher hydrogenating activity of aromatic compounds in the presence of a small quantity of sulphur in a gas oil, compared to the same catalyst prepared by incorporating the silicon beforehand in the support and adding platinum.

2. A process according to claim 1, said catalyst further comprising boron.

3. A process according to claim 1, said catalyst further comprising at least one metal from group VIB of the periodic table.

4. A process according to claim 1, said catalyst further comprising phosphorous.

5. A process according to claim 1, said catalyst further comprising at least one group VIIA element selected from the group consisting of fluorine, chlorine, bromine and iodine.

6. A process according to claim 1, said catalyst comprising, by weight with respect to the total catalyst mass:
   0.01% to 5% of platinum;
   0.1% to 97% of at least one support selected from the group consisting of amorphous matrices and low crystallinity matrices;
   0.1% to 40% of silicon.

7. A process according to claim 6, said catalyst further comprising 0.1% to 20% by weight of boron.

8. A process according to claim 7, said catalyst further comprising, by weight, 0.1% to 3% of at least one group VIB metal, 0.1% to 20% of phosphorus and 0.1% to 20% of at least one group VIIA element.

9. A catalyst according to claim 6, said catalyst further comprising 0.1% to 3% by weight of at least one group VIB metal.

10. A process according to claim 6, said catalyst further comprising 0.1% to 20% by weight of phosphorous.

11. A process according to claim 6, said catalyst further comprising 0.1% to 20% by weight of at least one group VIIA element.

12. A process according to claim 11, in which the group VIIA element is chlorine.

13. A process according to claim 11, in which the group VIIA element is fluorine.

14. A process according to claim 1, wherein the catalyst is prepared by a process in which a catalytic mass or precursor based on a support comprising platinum is impregnated with a solution containing phosphorus, and optionally with a solution containing boron, and optionally with a solution containing at least one group VIIA element, and optionally with a solution containing at least one group VIB metal.

15. A process according to claim 14, in which the precursor is impregnated by dry impregnation to fill the pores of the precursor.

16. A process according to claim 14 including the process preparation steps of:
   a) drying and weighing a solid termed the precursor, comprising at least the following compounds: a porous amorphous and/or low crystallinity matrix, platinum, optionally phosphorous, optionally boron, optionally at least one group VIIA element, and optionally at least one group VIB metal:
   b) impregnating the solid precursor defined in step a) with at least one solution containing silicon;
   c) optionally, leaving the impregnated solid precursor in a moist atmosphere at a temperature in the range 10° C. to 180° C.;
   d) drying the impregnated solid precursor obtained in step b) or c) at a temperature in the range 60° C. to 150° C.; and
   e) calcining the solid obtained from step d) at a temperature in the range 150° C. to 800° C.

17. A process according to claim 13, in which the phosphorous, the group VIIA element or elements, and the group VIB metal or metals are introduced by one or more impregnation operations, in any order.

18. A process according to clam 14, in which a drying and/or calcining step is carried out on the catalyst after at least one impregnation step.

19. A process according to claim 17, comprising hydrogenating aromatic compounds present in a hydrocarbon-containing feed at a temperature of more than 150° C., at a pressure of more than 0.1 MPa, with a hydrogen recycle ratio of more than 10 and at an hourly space velocity in the range 0.1 to 40 volumes of feed per volume of catalyst per hour.

20. A process according to claim 1, wherein said silicon is derived from a polyalkylsiloxane.

* * * * *